C. G. STAFFORD.
Reversible Toasting-Iron.

No. 224,740.  Patented Feb. 17, 1880.

Witnesses
Frank A. Brooks
J. H. Krouse

Inventor
Cyrus G. Stafford
By Dewey & Co.
Attys

UNITED STATES PATENT OFFICE.

CYRUS G. STAFFORD, OF EUREKA, CALIFORNIA.

REVERSIBLE TOASTING-IRON.

SPECIFICATION forming part of Letters Patent No. 224,740, dated February 17, 1880.

Application filed December 1, 1879.

*To all whom it may concern:*

Be it known that I, CYRUS G. STAFFORD, of Eureka, county of Humboldt, and State of California, have invented a Reversible Toasting-Iron; and I hereby declare the following to be a full, clear, and exact description thereof.

My invention relates to an improved device for toasting bread by the action of horizontally-radiated heat; and it consists in a plate with projecting wires or racks for holding the bread, mounted upon a second plate at the end of a handle, so as to be reversible horizontally, or about a vertical pivot or axis, and made adjustable to or from the fire by being moved upon its supporting-frame, and the whole apparatus is provided with hooks or other suitable attaching device, by which it may be supported from a grate-front, as will be more fully described and explained by referring to the accompanying drawings, in which—

Figure 1:
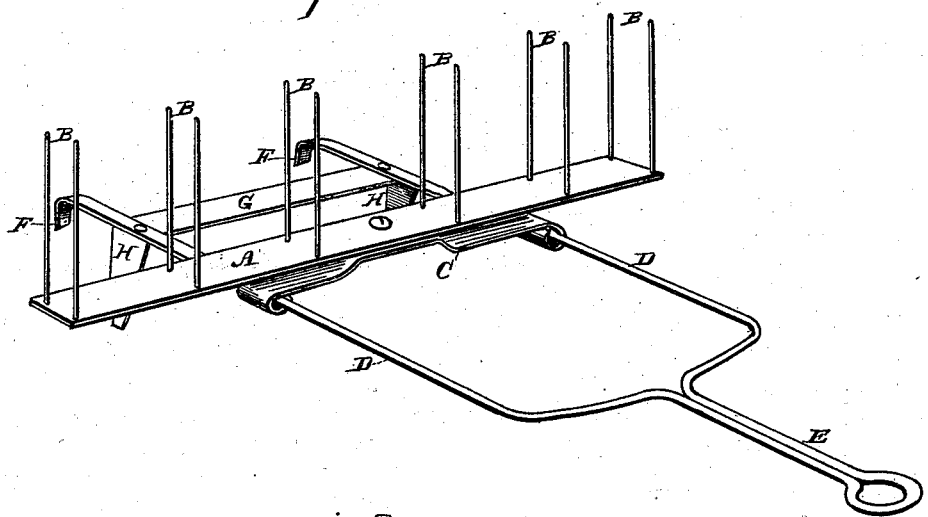
Figure 2:
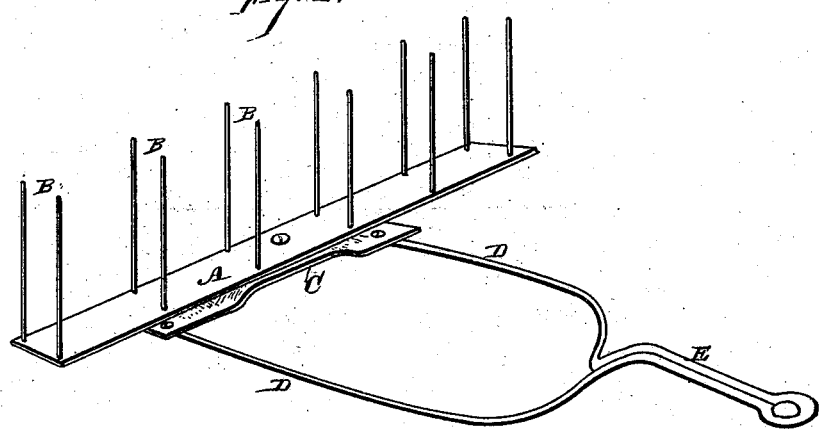
Figure 3:
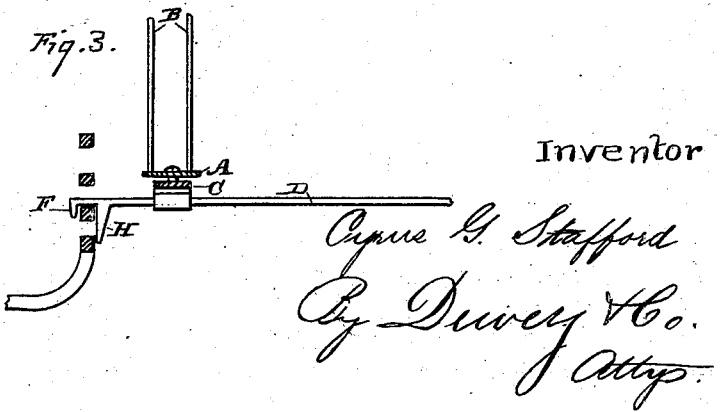

Figure 1 is a view of my toaster. Fig. 2 is a modification of the device. Fig. 3 shows its application.

A is a metal plate, having wires or racks B secured so as to project from one side in parallel lines or rows, between which the slices of bread or other substance to be toasted may be retained. This plate is pivoted at its center to a second plate, C, which may have its center slightly raised, as shown, so as to allow the plate A to turn easily and without too much friction.

The supporting-plate C may be secured to the handle, arms, or bars, as shown in Fig. 2, in its simplest form of construction; but I have found it preferable to make the rack adjustable to or from the fire, as follows: The side bars, D, are made parallel for some distance from the point where they unite to form the handle E, and the plate C may have its ends bent over so as to clasp or inclose these side bars, thus forming slides, while the bars D serve as guides upon which the plate C and its attached rack may move and the distance from the fire be adjusted. The extreme ends of the bars D are bent downward at a right angle, as shown at F, so that they may be hooked over the grate-bar of an open range or grate. A plate or bar, G, is bolted across these side bars, D, at such a distance from the hooked ends F as will admit the width of the grate-bar between them, as shown, and the ends of this plate G are bent down at a right angle, so as to form braces H, which rest against the outer portion of the grate-bar. The device will thus be supported by the hooks F and the braces H, and the rack can thus be moved to or from the fire, sliding upon the side bars, D, without altering the position of the apparatus.

The operation will then be as follows: The bread or other substance to be toasted is placed in slices edgewise between the rack-wires B, and the device held before the fire until one side is sufficiently cooked. It is then withdrawn, and the plate A is turned upon its axis, thus presenting the opposite side of the bread to the heat without in any way turning the handle. The whole forms a simple and effective toasting-iron.

When the device shown at Fig. 1 is employed the rack may be withdrawn by drawing the slide back until the rack can be reversed, after which it may be moved toward the fire as far as desired. The hooks or clamps hold the apparatus in the most suitable position when it is used with a grate, and the necessity for constant attention or holding is avoided.

Having thus described my invention, what I claim as new, and desire to secure by Letters Patent, is—

1. The toasting-iron consisting of the rack B, turning upon a vertical pin, so as to be reversible, as shown, in combination with the plate C and the guides D, substantially as herein described.

2. The parallel guides D, with the hooks or clamps F and the braces H, in combination with the reversible rack A, mounted upon the slide C, substantially as and for the purpose herein described.

In witness whereof I have hereunto set my hand.

CYRUS GIRSHAM STAFFORD.

Witnesses:
H. H. BARBER,
J. F. TAYLOR.